(12) United States Patent
Wang

(10) Patent No.: US 11,435,547 B2
(45) Date of Patent: Sep. 6, 2022

(54) LENS MODULE

(71) Applicant: AAC Optics Solutions Pte. Ltd., Singapore (SG)

(72) Inventor: Hailong Wang, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 298 days.

(21) Appl. No.: 16/916,161

(22) Filed: Jun. 30, 2020

(65) Prior Publication Data

US 2020/0409022 A1    Dec. 31, 2020

(30) Foreign Application Priority Data

Jun. 30, 2019   (WO) ................. PCT/CN2019/094093

(51) Int. Cl.
*G02B 7/02*   (2021.01)
*G02B 7/04*   (2021.01)

(52) U.S. Cl.
CPC ............ *G02B 7/025* (2013.01); *G02B 7/021* (2013.01); *G02B 7/023* (2013.01); *G02B 7/04* (2013.01)

(58) Field of Classification Search
CPC . G02B 7/00; G02B 7/02; G02B 7/023; G02B 7/021; G02B 7/025
USPC ........................................................ 359/819
See application file for complete search history.

(56) References Cited

U.S. PATENT DOCUMENTS

| | | | | |
|---|---|---|---|---|
| 8,208,209 | B2* | 6/2012 | Lee ....................... | G02B 13/003 359/811 |
| 11,360,288 | B2* | 6/2022 | Lin ..................... | G02B 27/0018 |
| 2011/0096418 | A1* | 4/2011 | Lee ....................... | G02B 13/003 359/819 |
| 2015/0002726 | A1* | 1/2015 | Schmieder ........... | G02B 27/646 359/823 |
| 2015/0198785 | A1* | 7/2015 | Yan ....................... | G02B 7/021 359/793 |
| 2018/0335607 | A1* | 11/2018 | Lin ......................... | G02B 7/022 |
| 2019/0243091 | A1* | 8/2019 | Lin ..................... | G02B 27/0018 |
| 2020/0041784 | A1* | 2/2020 | Wang .................... | G02B 5/005 |
| 2020/0049950 | A1* | 2/2020 | Wei ...................... | G02B 13/0015 |
| 2020/0057239 | A1* | 2/2020 | Ma ...................... | G02B 13/0045 |
| 2020/0241239 | A1* | 7/2020 | Lin ......................... | G02B 7/021 |

\* cited by examiner

*Primary Examiner* — William R Alexander
(74) *Attorney, Agent, or Firm* — W&G Law Group

(57) ABSTRACT

A lens module is provided, including a top wall with a light through hole and a barrel wall bent and extending from an edge of the top wall. The lens group includes a special-shaped lens which includes a side surface connecting an object side surface and an image side surface. The side surface includes a first abutting surface connected to the object side surface, and the first abutting surface is arranged at an included angle with an optical axis. The barrel wall includes an inner surface close to the optical axis, and the inner surface includes a second abutting surface arranged opposite to and parallel to the first abutting surface. A distance H between the first abutting surface and the second abutting surface is satisfied: 0 μm<H≤3 μm. A stability of the lens module is improved and an imaging quality of the lens module is ensured.

16 Claims, 4 Drawing Sheets

LENS MODULE

TECHNICAL FIELD

The present disclosure relates to optical imaging technology, in particular to a lens module.

BACKGROUND

With the continuous development of science and technology, electronic devices are continuously developing towards intelligence. In addition to digital cameras, portable electronic devices such as tablet computers and mobile phones are also equipped with lens modules having photo shooting and video shooting functions. The design of the lens module has always been the key to imaging quality of such products.

The existing lens module generally includes a lens barrel, a lens group arranged in the lens barrel, and a stopper for fixing the lens group in the lens barrel. The stopper is fixed on the lens barrel through dispensing and abuts against the lens group, thereby fixing the lens group in the lens barrel. The lens of the lens group may be stressed on both an object side and an image side, and the forces on both sides are not collinear, thus generating a torque, causing the lens to deform, and the deformation amount can reach 10 to 15 μm, which reduces an overall stability of the lens module, thus reducing the imaging quality of the lens module.

Therefore, it is necessary to provide a lens module.

SUMMARY

An objective of the present disclosure is to provide a lens module to solve a problem of a severe deformation of a lens of an existing lens module.

A technical solution of the present disclosure is as follows:

A lens module includes a lens barrel and a lens group. The lens barrel includes a top wall with a light through hole and a barrel wall bent and extending from an edge of the top wall, the top wall and the barrel wall are connected and define to form a cavity, and the lens group is accommodated in the cavity. The lens group includes a special-shaped lens, and the special-shaped lens includes a side surface connecting an object side surface and an image side surface. The side surface includes a first abutting surface connected to the object side surface, and the first butting surface is arranged at an included angle with an optical axis. The barrel wall includes an inner surface close to the optical axis, and the inner surface includes a second abutting surface arranged opposite to and parallel to the first abutting surface. A distance between the first abutting surface and the second abutting surface is greater than 1 μm and less than or equal to 3 μm.

Preferably, the inner surface further includes a stopper surface connected to the second abutting surface, the stopper surface is located on an object side of the second abutting surface, and an included angle between the stopper surface and the optical axis is greater than an included angle between the second abutting surface and the optical axis.

Preferably, the included angle between the first abutting surface and the optical axis is 45°.

Preferably, the side surface further includes a connecting surface, the connecting surface connects the first abutting surface and the image side surface of the special-shaped lens, and an included angle between the connecting surface and the optical axis is smaller than the included angle between the first abutting surface and the optical axis.

Preferably, the barrel wall further includes an outer surface arranged opposite to the inner surface, and the outer surface includes a transition surface arranged opposite to the second abutting surface.

Preferably, the lens group includes four lenses or five lenses, and the special-shaped lens is a third lens from an object side to an image side.

Preferably, the lens group includes six lenses and the special-shaped lens is a fourth lens from an object side to an image side.

Preferably, a stopper is further included. The stopper is located in the cavity, and a glue groove is arranged between the stopper and the inner surface, and the glue groove is filled with a glue to connect the stopper with the barrel wall.

The present disclosure has beneficial effects as follows: with respect to the lens module, the side surface of the lens of the above-described lens module includes the first abutting surface arranged at the included angle with the optical axis. The inner surface of the barrel wall includes the second abutting surface arranged opposite to and parallel to the first abutting surface, and the distance between the first abutting surface and the second abutting surface is more than 0 μm and less than or equal to 3 μm. When the lens is stressed and deformed, the first abutting surface abuts against the second abutting surface if the deformation amount exceeds the distance between the first abutting surface and the second abutting surface, thereby limiting a further deformation of the lens to improve stability of the lens module and ensure imaging quality of the lens module.

Figure 1:
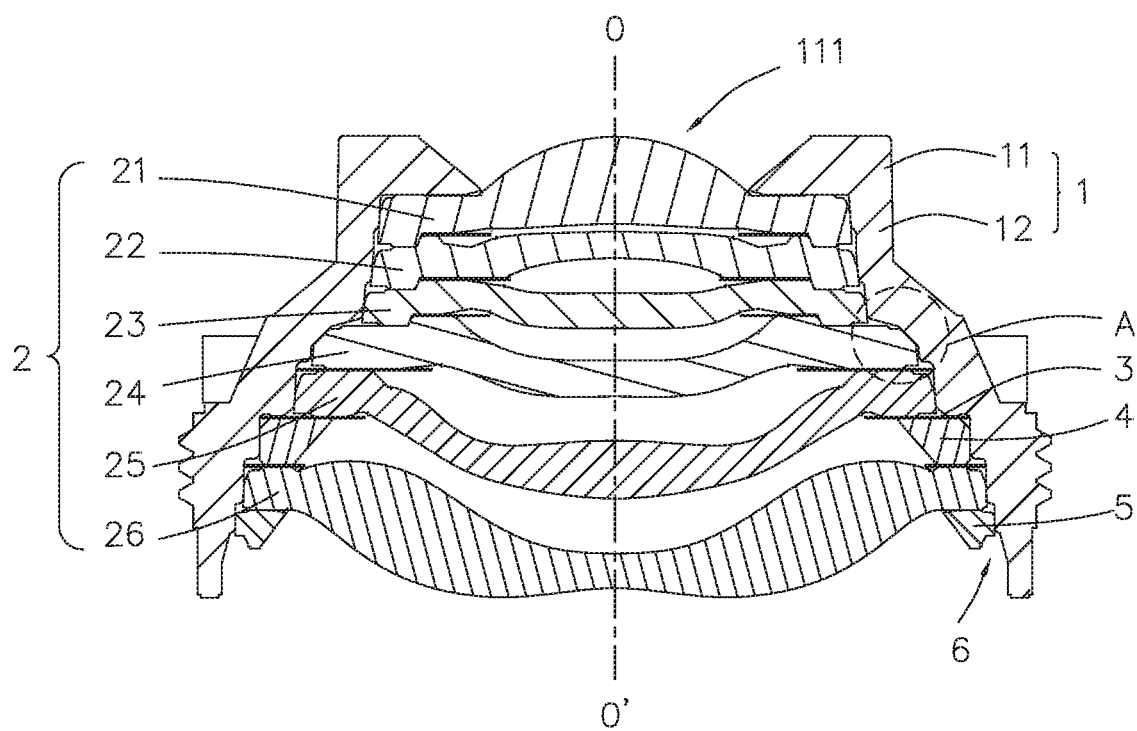
FIG. 1 is a schematic cross-sectional view of a lens module in an embodiment of the present disclosure.

The reference numerals in the specification are as follows:
1, Lens barrel; 11. Top wall; 111. Light through hole; 12. Barrel wall; 121. Inner surface; 1211. Second abutting surface; 1212. Stopper surface; 122. Outer surface; 1221. transition surface;
2. Lens group; 21. First lens; 22. Second lens; 23. Third lens; 24. Fourth lens; 241. Side surface; 2411. First abutting surface; 2412. Connecting surface; 242. Object side surface; 243. Image side surface; 25. Fifth lens; 26. sixth lens;
3. Light shielding sheet;
4. Light shielding plate;
5. Stopper;
6. Glue groove.

DETAILED DESCRIPTION

The present disclosure will be further illustrated below with reference to the accompanying drawings and embodiments.

Figure 2:
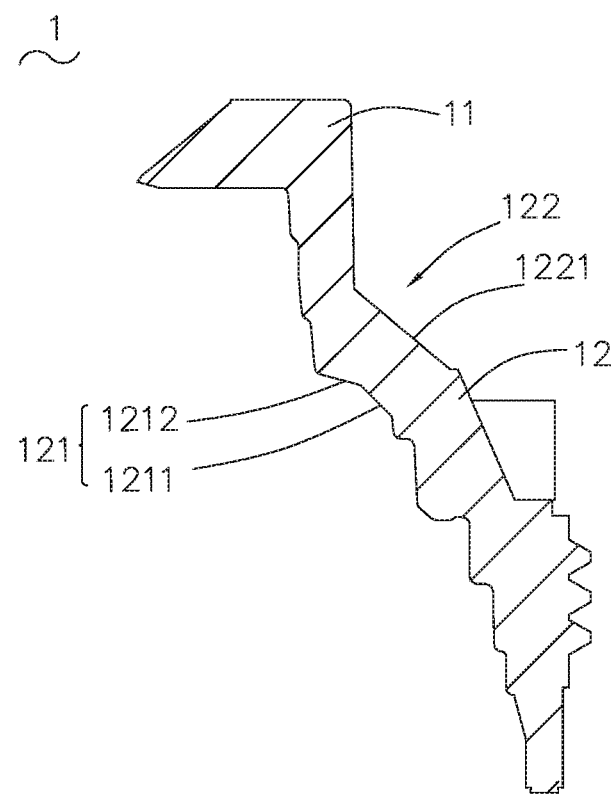
FIG. 2 is a schematic structural diagram of the lens barrel in FIG. 1.

Referring to FIGS. 1 and 2, an embodiment of the present disclosure discloses a lens module, including a lens barrel 1, a lens group 2, a light shielding sheet 3, a light shielding plate 4 and a stopper 5.

The lens barrel 1 includes a top wall 11 having a light through hole 111, and a barrel wall 12 bent and extending from an edge of the top wall 11. The top wall 11 and the barrel wall 12 are connected and define to form a cavity, and the barrel wall 12 includes an inner surface 121 close to an optical axis 00'.

In this embodiment, the lens group 2 includes six lenses, namely, a first lens 21, a second lens 22, a third lens 23, a fourth lens 24, a fifth lens 25 and a sixth lens 26, which are sequentially accommodated in the cavity from an object side to an image side. The light shielding plate 4 is sandwiched between the fifth lens 25 and the sixth lens 26, and the light shielding sheet 3 is sandwiched between two adjacent lenses or between the light shielding plate 4 and its adjacent lens. A glue groove 6 is arranged between the stopper 5 and the inner surface 121, and the glue groove 6 may be filled with a glue to connect the stopper 5 with the barrel wall 12.

Figure 3:
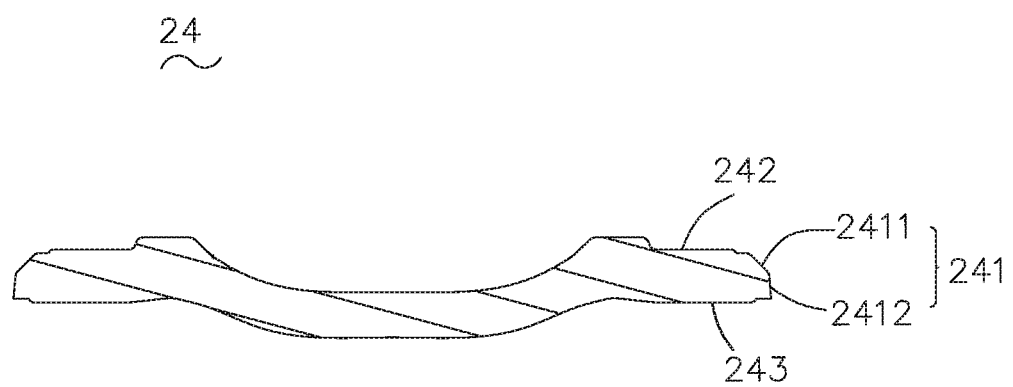
FIG. 3 is a schematic structural view of the fourth lens of FIG. 1.
Figure 4:
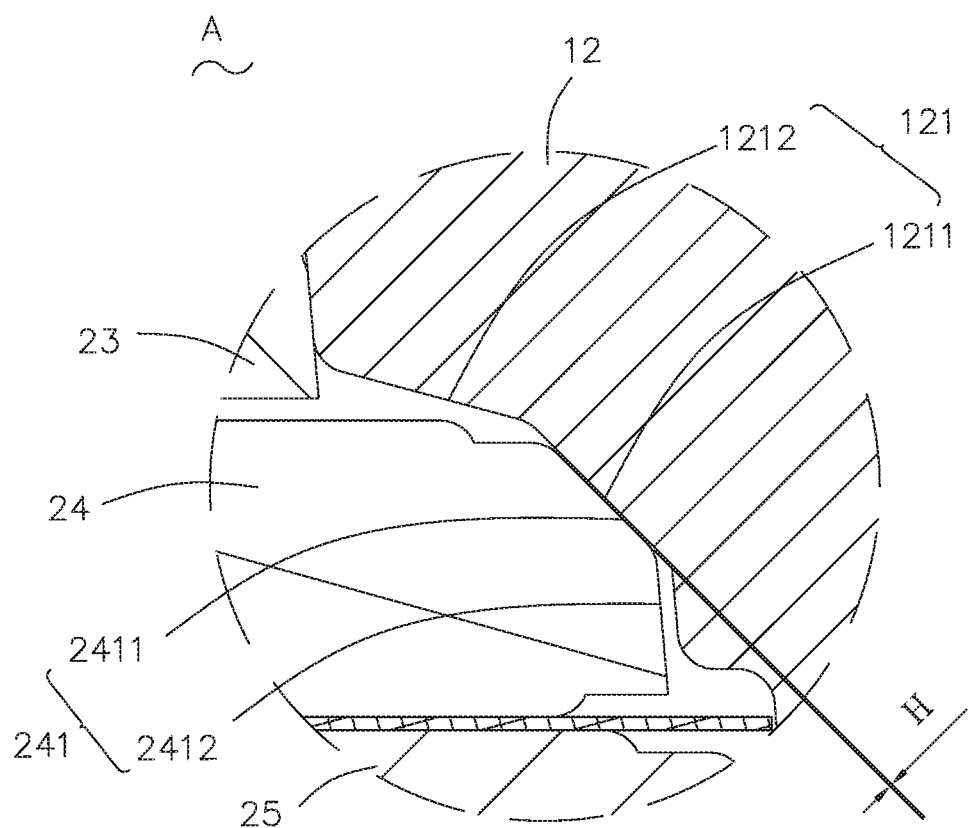
FIG. 4 is a partially enlarged view at A section in FIG. 1.

Also referring to FIGS. 3 and 4 together, the fourth lens 24 is a special-shaped lens, which includes an object side surface 242, an image side surface 243, and a side surface 241 connecting the object side surface 242 and the image side surface 243. The side surface 241 includes a first abutting surface 2411, and the first abutting surface 2411 is arranged at an included angle with an optical axis 00', that is, the included angle between the first abutting surface 2411 and the optical axis 00' is greater than 0° and less than or equal to 90°. The inner surface 121 includes a second abutting surface 1211 arranged opposite to the first abutting surface 2411, and the second abutting surface 1211 is parallel to the first abutting surface 2411. A distance H between the first abutting surface 2411 and the second abutting surface 1211 is greater than 0 μm and less than or equal to 3 μm.

When the fourth lens 24 is subjected to a downward pressing force from the third lens 23 abutting on its object side along a direction parallel to the optical axis 00' and a upward pressing force from the fifth lens 25 abutting on its image side along the direction parallel to the optical axis 00', the two pressing forces are not collinear and the two pressing forces act on the fourth lens 24 and generate a torque, causing the fourth lens 24 to deform.

Since the distance H between the first abutting surface 2411 and the second abutting surface 1211 is less than or equal to 3 μm, the first abutting surface 2411 abuts against the second abutting surface 1211 when a deformation amount of the fourth lens 24 reaches the distance H between the first abutting surface 2411 and the second abutting surface 1211, and the barrel wall 12 limits a further deformation of the fourth lens 24, thereby improving stability of the lens module and ensuring imaging quality.

Further, the inner surface 121 further includes a stopper surface 1212 connected to the second abutting surface 1211. The stopper surface 1212 is located on the object side of the second abutting surface 1211, and an included angle between the stopper surface 1212 and the optical axis 00' is larger than an included angle between the second abutting surface 1211 and the optical axis 00'.

When the fourth lens 24 is deformed, the stopper surface 1212 may limit a movement of the fourth lens 24 along the direction parallel to the second abutting surface 1211, thereby limiting the deformation of the fourth lens 24 together with the second abutting surface 1211.

More preferably, the included angle between the first abutting surface 2411 and the optical axis 00' is 45°, so that a larger resistance force may be generated to limit the further deformation of the fourth lens 24 when the second abutting surface 1211 abuts against the first abutting surface 2411.

Further, the side surface 241 further includes a connecting surface 2412. The connecting surface 2412 connects the first abutting surface 2411 and the image side surface 243, and an included angle between the connecting surface 2412 and the optical axis 00' is smaller than the included angle between the first abutting surface 2411 and the optical axis 00'. That is, the first abutting surface 2411 is indirectly connected to the image side surface 243 through the connecting surface 2412, so that the side surface 241 only contacts the inner surface 121 by the first abutting surface 2411 when the fourth lens 24 is deformed. During processing, it is only required to ensure a processing accuracy of the first abutting surface 2411 and the second abutting surface 1211 so as to more accurately control the distance H between the first abutting surface 2411 and the second abutting surface 1211. In other words, not only a production cost is reduced, but also the accuracy of the distance between the first abutting surface 2411 and the second abutting surface 1211 is ensured. In other embodiments, the first abutting surface 2411 may alternatively be directly connected to the image side surface 243.

Optionally, as shown in FIG. 2, the barrel wall 12 further includes an outer surface 122 arranged opposite to the inner surface 121. The outer surface 122 includes a transition surface 1221 arranged opposite to the second abutting surface 1211, so that a wall thickness of the barrel wall 12 is more uniform and a molding is more stable, which is conducive to improving an overall performance of the lens module.

It is worth mentioning that in this embodiment, the lens group 2 includes six lenses, and the fourth lens 24 is the special-shaped lens, which is provided with the first abutting surface 2411. In other embodiments, the lens group 2 alternatively includes four or five lenses. In this case, the third lens 23 is the special-shaped lens, which is provided with the first abutting surface 2411.

The description above is merely embodiments of the present disclosure, and it should be pointed out that, those of ordinary skills in the art may make improvements without departing from the inventive concept of the present disclosure, but these all belong to the protection scope of the present disclosure.

What is claimed is:

1. A lens module, comprising a lens barrel and a lens group, the lens barrel comprising a top wall with a light through hole and a barrel wall bent and extending from an edge of the top wall, the top wall and the barrel wall being connected and defining to form a cavity, and the lens group being accommodated in the cavity, wherein the lens group comprises a special-shaped lens, the special-shaped lens comprises a side surface connecting an object side surface and an image side surface, the side surface comprises a first abutting surface connected to the object side surface, and the first abutting surface is arranged at an included angle with an optical axis, wherein the barrel wall comprises an inner surface close to the optical axis, the inner surface comprises a second abutting surface arranged opposite to and parallel to the first abutting surface, and a distance between the first abutting surface and the second abutting surface is greater than 0 μm and less than or equal to 3 μm.

2. The lens module according to claim 1, wherein the inner surface further comprises a stopper surface connected to the second abutting surface, the stopper surface is located on an object side of the second abutting surface, and an included angle between the stopper surface and the optical axis is greater than an included angle between the second abutting surface and the optical axis.

3. The lens module according to claim 1, wherein the included angle between the first abutting surface and the optical axis is 45°.

4. The lens module according to claim 1, wherein the side surface further comprises a connecting surface, the connecting surface connects the first abutting surface and the image side surface of the special-shaped lens, and an included angle between the connecting surface and the optical axis is smaller than the included angle between the first abutting surface and the optical axis.

5. The lens module according to claim 1, wherein the barrel wall further comprises an outer surface arranged opposite to the inner surface, and the outer surface comprises a transition surface arranged opposite to the second abutting surface.

6. The lens module according to claim 1, wherein the lens group comprises four lenses or five lenses, and the special-shaped lens is a third lens from an object side to an image side.

7. The lens module according to claim 2, wherein the lens group comprises four lenses or five lenses, and the special-shaped lens is a third lens from an object side to an image side.

8. The lens module according to claim 3, wherein the lens group comprises four lenses or five lenses, and the special-shaped lens is a third lens from an object side to an image side.

9. The lens module according to claim 4, wherein the lens group comprises four lenses or five lenses, and the special-shaped lens is a third lens from an object side to an image side.

10. The lens module according to claim 5, wherein the lens group comprises four lenses or five lenses, and the special-shaped lens is a third lens from an object side to an image side.

11. The lens module according to claim 1, wherein the lens group comprises six lenses and the special-shaped lens is a fourth lens from an object side to an image side.

12. The lens module according to claim 2, wherein the lens group comprises six lenses and the special-shaped lens is a fourth lens from an object side to an image side.

13. The lens module according to claim 3, wherein the lens group comprises six lenses and the special-shaped lens is a fourth lens from an object side to an image side.

14. The lens module according to claim 4, wherein the lens group comprises six lenses and the special-shaped lens is a fourth lens from an object side to an image side.

15. The lens module according to claim 5, wherein the lens group comprises six lenses and the special-shaped lens is a fourth lens from an object side to an image side.

16. The lens module according to claim 1, wherein the lens module further comprises a stopper, the stopper is located in the cavity, and a glue groove is arranged between the stopper and the inner surface, and the glue groove is filled with a glue to connect the stopper with the barrel wall.

* * * * *